(12) United States Patent
Park et al.

(10) Patent No.: US 12,407,070 B2
(45) Date of Patent: Sep. 2, 2025

(54) BATTERY PACK

(71) Applicant: SK On Co., Ltd., Seoul (KR)

(72) Inventors: Ju Yong Park, Daejeon (KR); Seok Hwan Lee, Daejeon (KR); O Sung Kwon, Daejeon (KR); Myeong Hwan Ma, Daejeon (KR); Soo Jeong Jeong, Daejeon (KR); Wook Her, Daejeon (KR)

(73) Assignee: SK ON CO., LTD., Seoul (KR)

( * ) Notice: Subject to any disclaimer, the term of this patent is extended or adjusted under 35 U.S.C. 154(b) by 694 days.

(21) Appl. No.: 17/700,878

(22) Filed: Mar. 22, 2022

(65) Prior Publication Data
US 2022/0311101 A1 Sep. 29, 2022

(30) Foreign Application Priority Data
Mar. 26, 2021 (KR) .................. 10-2021-0039796

(51) Int. Cl.
*H01M 50/507* (2021.01)
*H01M 50/209* (2021.01)
(52) U.S. Cl.
CPC ....... *H01M 50/507* (2021.01); *H01M 50/209* (2021.01)
(58) Field of Classification Search
CPC ............. H01M 50/383; H01M 50/209; H01M 50/507; H01M 50/50; H01M 50/58; H01M 50/05
See application file for complete search history.

(56) References Cited

U.S. PATENT DOCUMENTS

| 7,369,397 | B2 * | 5/2008 | Yamamoto | H01G 9/14 |
| | | | | 361/329 |
| 2016/0344012 | A1 | 11/2016 | Fukushima et al. | |
| 2018/0366713 | A1 | 12/2018 | Nakayama et al. | |
| 2019/0206593 | A1 | 7/2019 | Fukushima et al. | |
| 2019/0221817 | A1 * | 7/2019 | Jeon | H01M 50/50 |
| 2019/0305282 | A1 * | 10/2019 | Jeon | H01M 50/24 |
| 2020/0035967 | A1 * | 1/2020 | Yoon | H01M 50/24 |
| 2022/0294075 | A1 * | 9/2022 | Jung | H01M 50/383 |
| 2023/0041000 | A1 * | 2/2023 | Tandon | H01M 50/249 |

FOREIGN PATENT DOCUMENTS

JP 6477858 B1 3/2019

OTHER PUBLICATIONS

Extended European Search Report for the European Patent Application No. 22163607.9 issued by the European Patent Office on Jul. 27, 2022.

* cited by examiner

*Primary Examiner* — Basia A Ridley
*Assistant Examiner* — Julia Marie Fehr
(74) *Attorney, Agent, or Firm* — IP & T GROUP LLP

(57) ABSTRACT

A battery pack includes a pack case accommodating a plurality of battery modules, a bus bar coupled to two battery modules among the plurality of battery modules and interconnecting terminals provided in the two battery modules, and a bus bar cover accommodating the bus bar therein and coupled to the bus bar, wherein the bus bar cover is configured to surround the bus bar and entire upper and side surfaces.

18 Claims, 9 Drawing Sheets

BATTERY PACK

CROSS-REFERENCE TO RELATED APPLICATION(S)

This application claims benefit of priority to Korean Patent Application No. 10-2021-0039796 filed on Mar. 26, 2021 in the Korean Intellectual Property Office, the disclosure of which is incorporated herein by reference in its entirety.

BACKGROUND

1. Field

Example embodiments of the present disclosure relate to a battery pack.

2. Description of Related Art

Recently, a high-power battery pack using a non-aqueous electrolyte having high energy density has been developed. Such a high-power battery pack may be implemented with large capacity by connecting a plurality of battery modules in series or in parallel such that the battery pack may be used to drive a motor of a device requiring high power, such as an electric vehicle, for example.

In a general battery pack, a plurality of battery modules may be electrically connected through a bus bar, such that, when a flame occurs in the battery pack, insulation of the bus bar may be destroyed due to the flame and the bus bar may move, and accordingly, there may be a possibility that the bus bar may be in contact with a surrounding structure. In this case, an additional flame or explosion may occur due to a short circuit.

SUMMARY

One embodiment of the present disclosure provides a battery pack which may prevent issues caused by a short circuit when a flame occurs in the battery pack.

According to one embodiment of the present disclosure, a battery pack includes a pack case accommodating a plurality of battery modules, a bus bar coupled to two battery modules among the plurality of battery modules and interconnecting terminals of the two battery modules, and a bus bar cover accommodating the bus bar therein and coupled to the bus bar, wherein the bus bar cover is configured to surround the bus bar and entirely cover an upper surface and side surfaces of the bus bar.

The bus bar cover may include an accommodation portion including an accommodation space for accommodating the bus bar, and an extension portion extending away from the accommodation portion to cover the side surfaces of the bus bar.

The accommodation portion may include an upper surface portion opposing the upper surface of the bus bar, and a side surface portion extending from the upper surface portion and opposing the side surfaces of the bus bar.

At least a portion of the side surface portion may be disposed between the bus bar and a case of the battery module.

The extension portion may include a first extension portion disposed to oppose at least one of the side surfaces of the battery module on which the terminal is disposed, and a second extension portion disposed between the two battery modules.

The pack case may include a reinforcing frame disposed between the battery modules, and the extension portion may include a frame insertion portion into which the reinforcing frame is inserted.

The bus bar cover may include an accommodation portion including an accommodation space for accommodating the bus bar and covering entirely the upper surface and the side surfaces of the bus bar, and a coupling portion disposed below the bus bar and coupled to the accommodation portion.

The battery pack may further include a module cover coupled to each of the battery modules, wherein the module cover accommodates a side surface of at least one of the battery modules on which the terminal is disposed.

The module cover may have at least one slot into which the bus bar is inserted.

The module cover may include mica.

The module cover may be configured to cover an entirely of upper and side surfaces of the battery module formed in a rectangular parallelepiped shape.

According to another embodiment of the present disclosure, a battery pack includes at least two battery modules, a bus bar electrically connecting the at least two battery modules to each other, and module covers coupled to the at least two battery modules, respectively, wherein each of the module covers accommodates one side surface of the battery module on which a terminal is disposed therein, and is coupled to the battery module.

Each of the module covers may include at least one slot into which the bus bar is inserted.

According to another embodiment of the present disclosure, a battery pack includes a pack case accommodating a plurality of battery modules, a bus bar coupled to two battery modules among the plurality of battery modules and interconnecting terminals of the two battery modules, and a bus bar cover accommodating the bus bar therein and coupled to the bus bar, wherein the bus bar cover is configured to prevent flames or conductive particles in one battery module from spreading to an adjacent battery module.

The bus bar cover may conform to a shape of the bus bar.

The bus bar cover may include at least one of a refractory material or a ceramic material.

The bus bar cover may include means for preventing shorting between the plurality of battery modules.

The battery pack may further include a reinforcing frame disposed between the plurality of battery modules and a module cover coupled to at least one of the battery modules, wherein the module cover has a blocking portion disposed adjacent to the reinforcing frame to prevent the spreading of the flames or conducting particles to an adjacent battery module.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
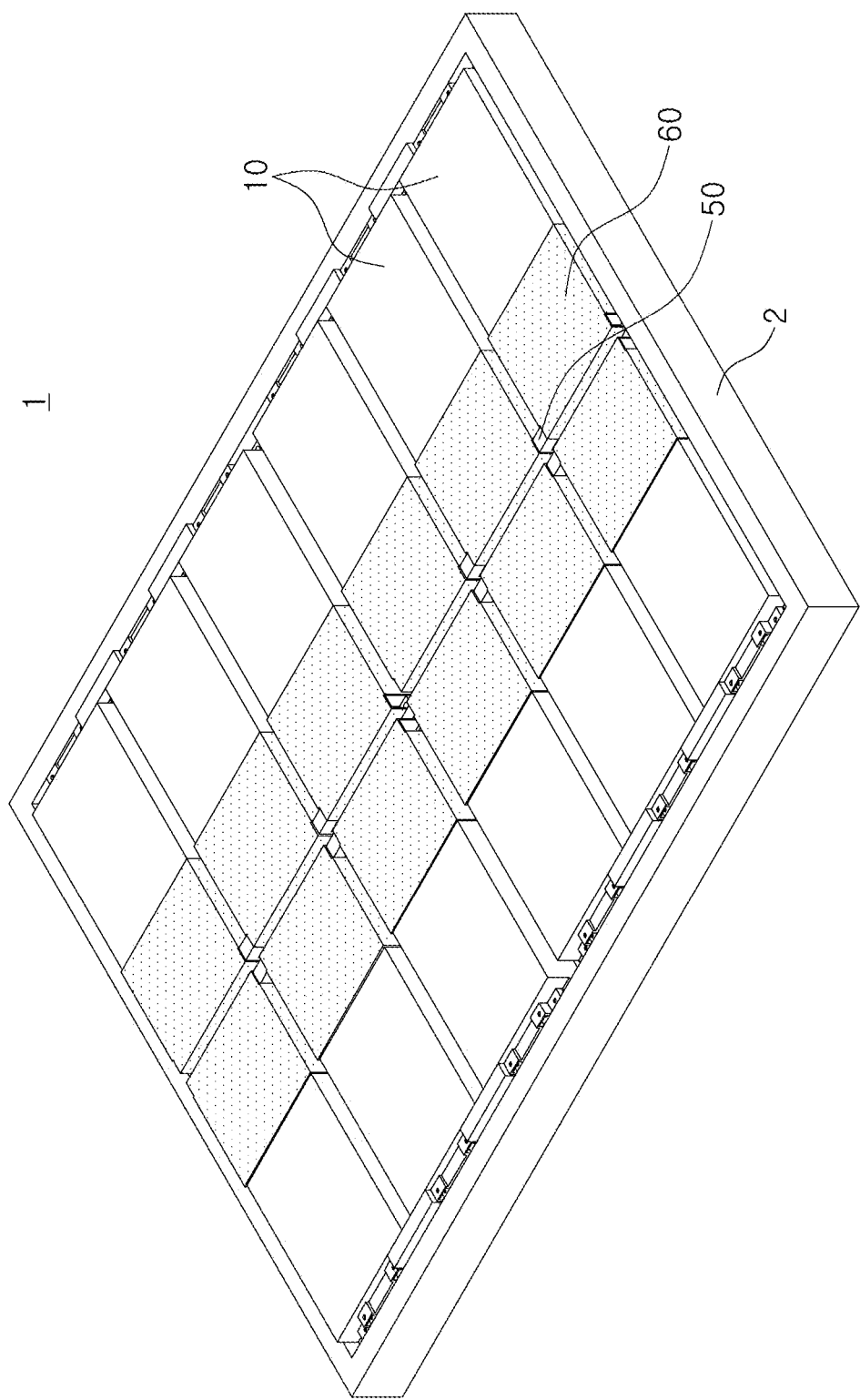
FIG. 1 is a perspective diagram illustrating a battery pack according to one embodiment of the present disclosure.

It is to be understood that the terms or words used in this description and the following claims must not be construed to have meanings which are general or may be found in a dictionary. Therefore, considering that an inventor may most properly define the concepts of the terms or words to best explain his or her invention, the terms or words must be understood as having meanings or concepts that conform to the disclosed technical aspects the present disclosure. Also, since the embodiments set forth herein and the configurations illustrated in the drawings are nothing but a mere example(s) and are not representative of all technical aspects of the present disclosure, it is to be understood that various equivalents and modifications may replace the disclosed embodiments and configurations of the present application.

In the drawings, same elements will be indicated by same reference numerals. Also, redundant descriptions and detailed descriptions of known functions and elements that may unnecessarily make the present disclosure obscure will be omitted. In the accompanying drawings, some elements may be exaggerated, omitted or briefly illustrated, and the sizes of the elements do not necessarily reflect the actual sizes of these elements.

For example, in embodiments disclosed, the terms "upper side," "upper portion," "lower side," "lower portion," and the like, are described with reference to the drawings, and when a direction of a corresponding element changes, the terms may be expressed differently.

Figure 2:
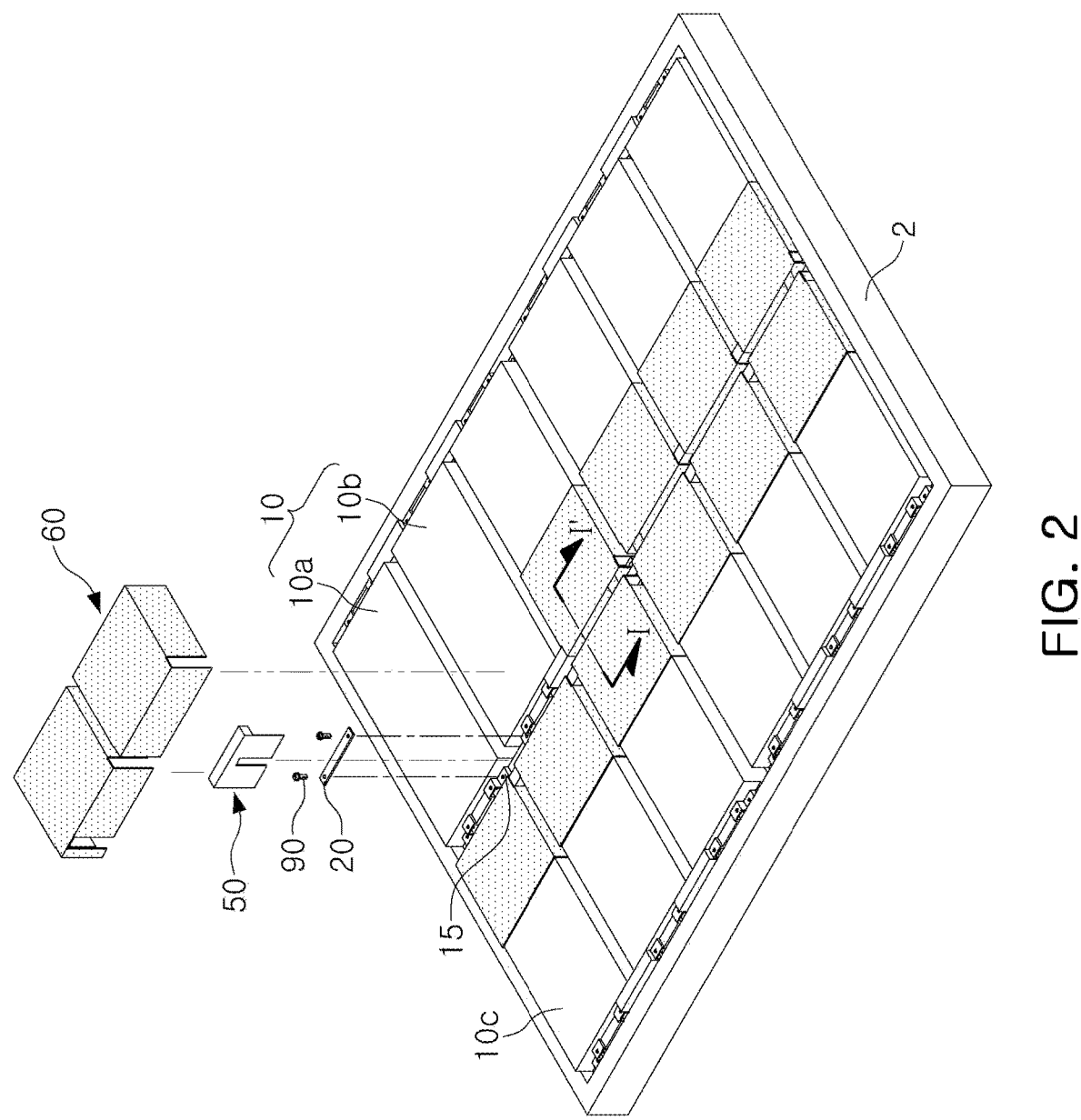
FIG. 2 is an exploded perspective diagram illustrating a portion of the battery pack illustrated in FIG. 1.
Figure 3:
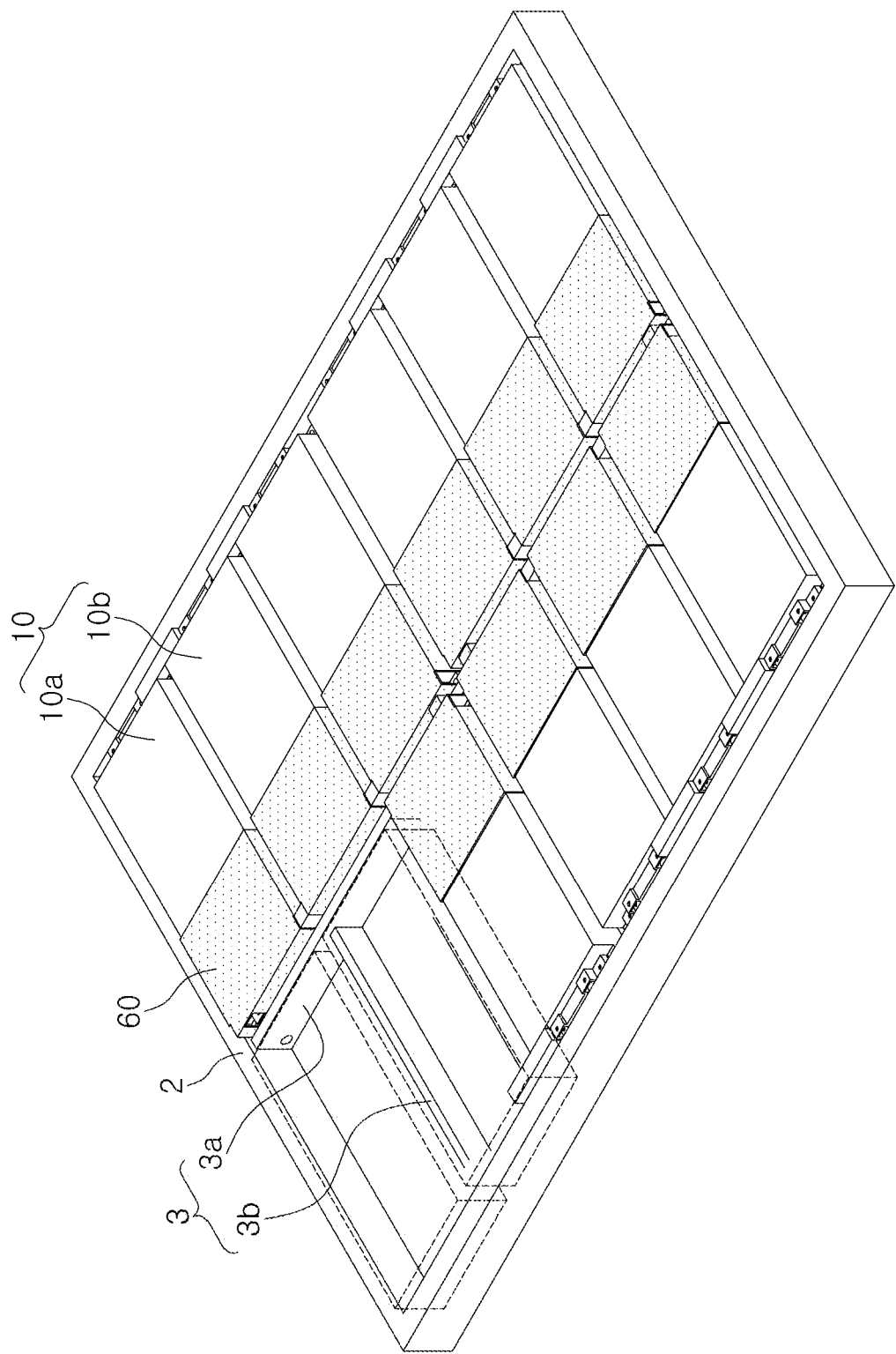
FIG. 3 is a diagram illustrating a battery module illustrated in FIG. 1 of which a portion is omitted.
Figure 4:
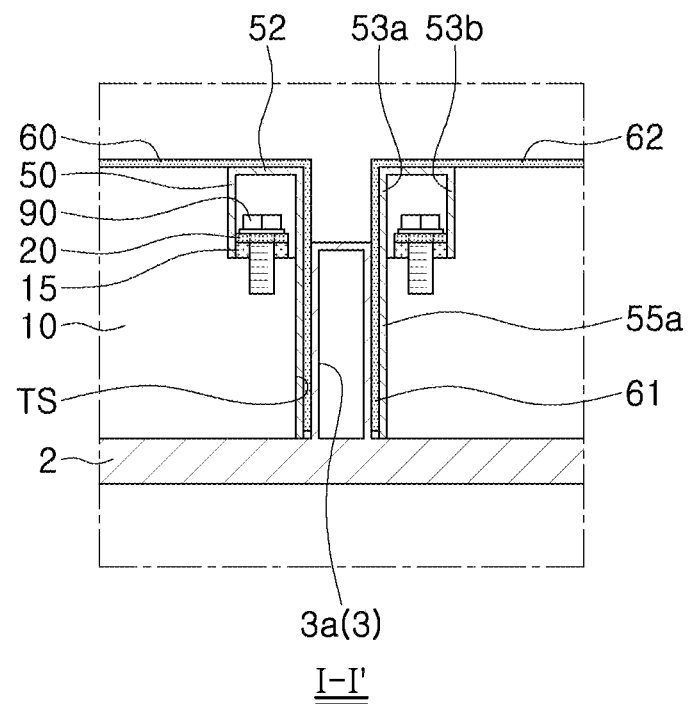
FIG. 4 is a cross-sectional diagram taken along line I-I' in FIG. 2.

FIG. 1 is a perspective diagram illustrating a battery pack according to one embodiment of the present disclosure. FIG. 2 is an exploded perspective diagram illustrating a portion of the battery pack illustrated in FIG. 1. FIG. 3 is a diagram illustrating a battery module illustrated in FIG. 1 of which a portion is omitted. FIG. 4 is a cross-sectional diagram taken along line I-I' in FIG. 2.

Referring to FIGS. 1 to 4, a battery pack 1 in one embodiment may include a pack case 2, a plurality of battery modules 10, a bus bar 20, and a bus bar cover 50.

The pack case 2 may provide a space for accommodating the other components therein. In the drawings, for ease of description, the pack case 2 is illustrated in a form, shape, or configuration partially enclosing a lower portion and a side surface in the battery module 10, but the pack case 2 may be provided to enclose the entirety of battery modules 10. Accordingly, in one embodiment the pack case 2 may form an overall exterior of the battery pack 1.

Also, pack case 2 in the embodiment shown in FIG. 3 may include a reinforcing frame 3 in which the battery modules 10 are disposed therebetween.

The reinforcing frame 3 may be provided to reinforce the rigidity of the pack case 2. The reinforcing frame 3 may be disposed in a form, shape, or configuration dividing the space in which the battery modules 10 are disposed. Accordingly, in one embodiment, the reinforcing frame 3 may be disposed in between two battery modules 10 spaced apart from each other by a predetermined distance.

The reinforcing frame 3 may be formed or otherwise configured in the form of a partition wall fastened to a bottom surface of the pack case 2.

The reinforcing frame 3 in the embodiment shown in FIG. 3 may include a first reinforcing frame 3a disposed to extend across both battery modules 10a and 10c and is arranged such that terminal surfaces TS (as shown in FIG. 4) of a battery module 10 (on which terminal 15 is disposed or otherwise accommodated) may oppose each other in the battery module 10. A second reinforcing frame 3b is disposed in between two battery modules 10a and 10b, as seen in FIG. 3, to provide a space for accommodating battery modules 10a and 10b. More than one reinforcing frame 3b can be disposed side by side with each other. The terminal surfaces TS of battery module (s) 10 may be disposed facing the same direction as reinforcing frame 3b extends. Accordingly, the spaces in which the battery modules 10 are disposed may be partitioned by the reinforcing frames 3.

However, the present disclosure is not limited thereto, and only one of the first reinforcing frame 3a and the second reinforcing frame 3b may be provided if necessary.

The reinforcing frame 3 may have a configuration in which the reinforcing frame 3 has a height lower than a height of the battery module 10. For example, an upper end surface of the reinforcing frame 3 may be disposed in a position lower than the plane on which the terminal 15 is disposed.

The reinforcing frame 3 may include a vent hole providing a gas flow path for discharging a gas (generated for example in thermal runaway) externally of the battery pack, such that high-pressure gas may be smoothly discharged during thermal runaway.

In one embodiment of the present disclosure, the first reinforcing frame 3a and the second reinforcing frame 3b may be interconnected with each other. However, present invention is not limited thereto. In one embodiment of the present invention (such as shown in FIG. 4), module cover 60 (coupled to at least one of the battery modules 10) has a blocking portion (discussed in more detail later) extending downward from upper surface cover 62 and disposed adjacent to reinforcing frame to prevent spreading of flames to an adjacent battery module.

Each of the battery modules 10 may have a hexahedral shape or configuration, and may be arranged side by side in one direction. Each battery module 10 may include a battery such as a lithium secondary battery or a nickel-hydrogen secondary battery, which may be charged and discharged.

As shown in FIG. 2, each battery module 10 may be provided with terminal 15 on one side. The terminal 15 may be a conductive member exposed externally of the battery module 10 for electrical connection, and may be electrically connected to internal secondary batteries of the battery module 10.

The terminal 15 may be disposed parallel to a bottom surface of the pack case 2 on which the battery module 10 is seated. A lower surface of the terminal 15 may be supported by the case of the battery module 10, and an upper surface of the terminal 15 may be opened externally of the battery module 10.

The terminal 15 may include a positive terminal and a negative terminal disposed spaced apart from each other.

The bus bar 20 may be fastened to a plurality of the terminals 15 through a bus bar fastening member 90 (as shown in FIG. 2). As the bus bar fastening member 90, a member such as a bolt or a screw may be used, and the bus bar fastening member 90 may penetrate the bus bar 20 and the terminal 15 in order and may be fastened to the battery module 10. Accordingly, the bus bar 20 may be pressed toward the terminal 15 by the bus bar fastening member 90 and may be physically/electrically connected to the terminal 15.

The bus bar 20 may interconnect (as shown in FIG. 2) a terminal 15 of one battery module 10a to a terminal 15 of another battery module 10b. For example, the bus bar 20 may be in contact with a negative terminal 15 provided in the battery module 10a and a positive terminal 15 provided in another neighboring (or adjacent) battery module 10b, and may electrically/physically interconnect the terminals 15.

Accordingly, the plurality of battery modules 10 may be connected in series or in parallel by the bus bar 20.

As illustrated in FIG. 2, the bus bar 20 according to this embodiment may have a conductive member in the shape or configuration of a substantially rectangular bar. Accordingly, when the bus bar 20 is coupled to the terminal 15, a lower surface of the bus bar 20 may be disposed to oppose the terminal 15 and the upper surface may be disposed toward the outside of the battery module 10.

Since one bus bar 20 interconnects the terminals 15 of the two battery modules 10b and 10a, the bus bar 20 may be configured to have a length corresponding to the spacing distance between terminals 15.

The bus bar 20 may be formed of a material having flexibility. Also, the bus bar 20 may be formed in a form in which an insulating layer is coated on a surface of a conductive material (such as copper) to secure insulation from surrounding structures. However, the present invention is not limited thereto.

Figure 5:
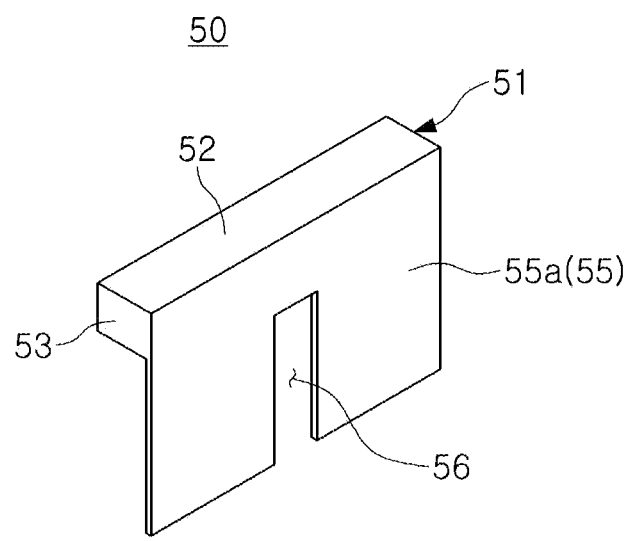
FIG. 5 is an enlarged perspective diagram illustrating a bus bar cover illustrated in FIG. 2.
Figure 6:
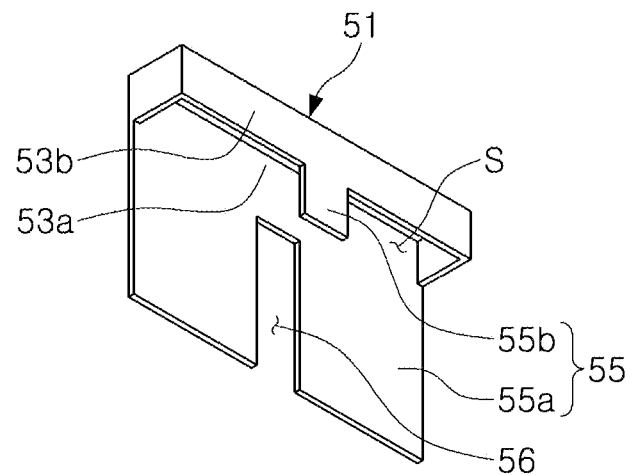
FIG. 6 is a perspective diagram illustrating the bus bar cover illustrated in FIG. 5, viewed from the below.

FIG. 5 is an enlarged perspective diagram illustrating a bus bar cover illustrated in FIG. 2. FIG. 6 is a perspective diagram illustrating the bus bar cover illustrated in FIG. 5, viewed from the below.

Referring to FIGS. 5 and 6 together, a bus bar cover 50 may accommodate the bus bar 20 therein and may be coupled to the bus bar 20.

The bus bar cover 50 may be provided to prevent a short circuit when the bus bar 20 is in contact with other structures and may prevent the occurrence of a flame in the battery module 10. The bus bar cover 50 may also provide a function of preventing spread of flames or conductive particles to other adjacent battery modules 10.

The bus bar cover 50 in this embodiment may include an accommodation portion 51 and an extension portion 55.

The accommodation portion 51 may have the configuration of a cap and may have an accommodation space S which extend away from a top of the bus bar cover 50 and in the illustrated embodiment in FIG. 6 opens downwardly. Therefore, in the process of assembling the battery pack 1, the bus bar cover 50 may be disposed above the bus bar 20, may move toward the bus bar 20 side and may accommodate the bus bar 20 in the accommodation space S, and may be coupled to or otherwise contact the bus bar 20. Accordingly, the accommodation space S may be configured to have a size to fully accommodate the bus bar 20. In this embodiment, the bus bar cover conforms to the shape of the bus bar 20.

The accommodation portion 51 may be configured to surround entire upper and side surfaces of the bus bar 20. To this end, the accommodation portion 51 may include an upper surface portion 52 covering an upper surface of the bus bar 20 and a side surface portion 53 covering a side surface of the bus bar 20.

The upper surface portion 52 may be disposed to oppose the entire upper surface of the bus bar 20. Also, the side surface portion 53 may extend from the upper surface portion 52 and may be disposed to oppose each of four side surfaces of the bus bar 20. Accordingly, the side surface portion 53 may be formed to surround the entire side surface of the bus bar 20.

The side surface portion 53 of the bus bar cover 50 may include a second side surface 53b disposed between the bus bar 20 and the case of the battery module 10. Accordingly, a space in which the second side surface 53b of the bus bar cover 50 may be disposed may be provided between the terminal 15 of the battery module 10 and the case of the battery module 10.

The extension portion 55 may be configured to extend in the downward direction from the accommodation portion 51, and the extension portion 55 in the embodiment shown in FIG. 6 may include a first extension portion 55a and a second extension portion 55b.

The first extension portion 55a may be disposed to oppose the terminal surface TS on which the terminal 15 is disposed among side surfaces of the battery module 10. Accordingly, the first extension portion 55a may extend from the first side surface 53a disposed on an outermost side of the side surface portion 53.

In one embodiment of the present disclosure, the accommodation portion 51 may be simultaneously seated in between the two battery modules 10a and 10b interconnected by the bus bar 20. Accordingly, the first extension portion 55a extending from the accommodation portion 51 may be disposed to oppose each of the two battery modules 10a and 10b. For example, the first extension portion 55a may be disposed to oppose a region of the terminal surface TS of the battery module 10, disposed below the bus bar 20.

As described above, a second reinforcing frame 3b may be disposed between the battery modules 10. Accordingly, the first extension portion 55a may include a frame insertion portion 56 into which the second reinforcing frame 3b is inserted.

The frame insertion portion 56 may be formed as a groove in a configuration for cutting a relief in the first extension portion 55a. Also, to prevent a flame or conductive particles from moving into a gap formed between the frame insertion portion 56 and the second reinforcing frame 3b, the second reinforcing frame 3b may be coupled to the frame insertion portion 56 by being proximate to the frame insertion portion 56.

Accordingly, an overall shape of the frame insertion portion 56 may correspond to a cross-sectional surface of the second reinforcing frame 3b inserted into the frame insertion portion 56. Also, a size or a shape (or a configuration) of the frame insertion portion 56 may be varied depending on a size or presence or absence of the second reinforcing frame 3b.

The second extension portion 55b may be disposed between two battery modules 10a and 10b interconnected by a single bus bar 20. Accordingly, the second extension portion 55b may extend from the second side surface 53b of the side surface portion 53, disposed between the case of the battery module 10 and the bus bar 20.

Since the first side surface 53a and the second side surface 53b of the accommodation portion 51 are spaced apart from each other in a lateral direction by a predetermined distance and are arranged side by side, the first extension portion 55a and the second extension portion 55b may also be spaced apart from each other and may be arranged side by side. However, an example embodiment thereof is not limited thereto.

As the second reinforcing frame 3b is disposed between the battery modules 10a and 10b, the second extension portion 55b may have a configuration for blocking the space between the accommodation portion 51 and the second reinforcing frame 3b. Accordingly, a size of the second extension portion 55b may be varied depending on a size or presence or absence of the second reinforcing frame 3b.

In one embodiment of the present disclosure, the extension portion 55 and the accommodation portion 51 may be configured to have the same thickness, but the present invention is not limited thereto. For example, the extension portion 55 and the accommodation portion 51 may be configured to have different thicknesses if desired. Also, various modifications of the second extension portion 55b may be made if desired such that the second extension portion 55b may extend along an upper surface of the second reinforcing frame 3b.

The bus bar cover 50 may be formed of a flame retardant material or a fireproof insulating material which may block spread of a flame. In one example, the bus bar cover 50 may be formed of a material which does not melt or ignite below 1000° C., for example mica. Also, for increased heat resistance, the bus bar cover 50 may be formed from a plate material having a thickness of 1 mm or more. However, the present invention is not limited thereto.

Through this configuration, the battery pack 1 in the one embodiment of the present disclosure may reduce a flame, a gas, and conductive particles generated in the battery pack 1 from affecting other battery modules 10.

Generally, the surrounding region of the terminal 15 may be formed of a resin material for electrical insulation in the battery module 10, such that the surrounding region of the terminal 15 may be vulnerable to heat. Therefore, when thermal runaway or a flame occurs in the battery module 10, a gas and conductive particles may be discharged externally of the battery module 10 through the terminal 15.

However, in battery pack 1 in one embodiment, since the bus bar 20 is accommodated in the accommodation space S of the bus bar cover 50, most of flames or a gas and conductive particles discharged from the vicinity of the bus bar 20 may be prevented from flowing by the bus bar cover 50.

For example, in this bus bar cover 50, flames or conductive particles generated in the battery pack 1 may be prevented from being emitted to the bus bar 20 side of an adjacent or neighboring battery modules 10 which are contact with the corresponding bus bar 20.

Also, since the first extension portion 55a of the bus bar cover 50 is extended from a front side of the bus bar 20 to a lower portion of the bus bar, inflow of flames or conductive particles into the bus bar cover 50 through the lower portion of the bus bar cover may be prevented.

As described above, the battery pack 1 in one embodiment of the present disclosure may prevent the bus bar 20 from being directly exposed to flames or conductive particles, such that the removal (or destruction) of the insulating layer of the bus bar 20 caused by flames may be prevented, and accordingly, additional damages caused by a short circuit between the bus bar 20 and surrounding structures may be prevented.

Also, the battery pack 1 in the example embodiment may further include a module cover 60.

Figure 7:
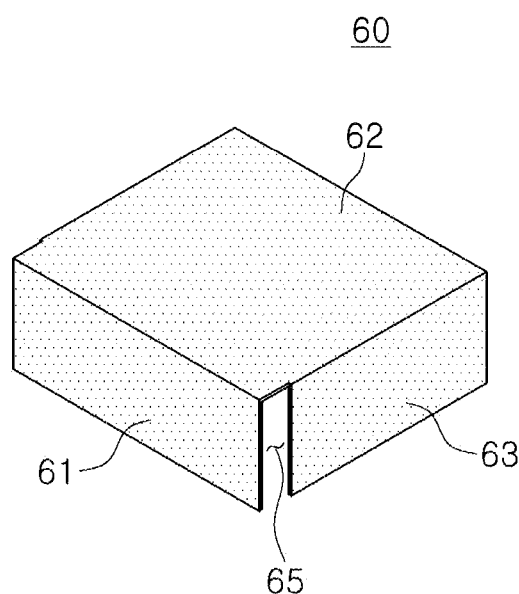
FIG. 7 is an enlarged perspective diagram illustrating a module cover illustrated in FIG. 2.

FIG. 7 is an enlarged perspective diagram illustrating a module cover illustrated in FIG. 2. Referring to FIG. 7, the module cover 60 according to one embodiment of the present disclosure may be coupled to each battery module 10 by having a configuration for covering at least a portion of the battery module 10 and may prevent the spread of flames or conductive particles.

The module cover 60 may accommodate a terminal surface TS of the battery module 10 having a rectangular parallelepiped shape, on which the terminal 15 is disposed, and may be coupled to the battery module 10.

For example, the module cover 60 may be formed in a shape surrounding the terminal surface TS, and to this end, the module cover 60 may include a blocking portion 61 disposed to oppose the terminal surface TS of the battery module 10, an upper surface cover 62 extending from the blocking portion 61 and disposed above the battery module 10, and a side surface cover 63 extending from the upper surface cover 62 to oppose both side surfaces of the battery module 10. Both side surfaces of the battery module 10 opposing the side surface cover 63 may refer to the side surfaces connected to the terminal surface TS of the battery module 10.

The upper surface cover 62 and the side surface cover 63 of the module cover 60 may be in contact with one battery module 10 and may be coupled to the battery module 10. Also, when the module cover 60 is coupled to the battery module 10, the blocking portion 61 of the module cover 60 may be disposed to be in contact with the terminal surface TS of the battery module 10 or may be disposed in a position adjacent to the terminal surface TS.

As described above, since the battery modules 10 are interconnected by the bus bar 20, when the module cover 60 is coupled to the battery module 10, interference may occur between the module cover 60 and the bus bar 20. Accordingly, the module cover 60 in the example embodiment may include at least one slot 65.

The slot 65 may have a configuration partially cutting the module cover 60, and may be configured to have a width greater than a width of the bus bar 20 such that the bus bar 20 may be inserted there into.

As described above, the bus bar cover 50 may be coupled to the bus bar 20. Therefore, the slot 65 in one embodiment of the present disclosure may be configured to have a size for the bus bar cover 50 to be inserted there into.

Referring to FIG. 2, the bus bar 20 may connect two battery modules 10a and 10b arranged side by side. Accordingly, the slot 65 in the example embodiment may be formed on the side surface cover 63 disposed between the two battery modules 10 described above. Specifically, the slot 65 may be formed in a portion in which the blocking portion 61 and the side surface cover 63 are connected.

In one embodiment of the present disclosure, the module cover 60 may include a high heat resistant material such as a refractory or ceramic material, for example mica. However, the present invention is not so limited to mica or a mica material, and the module cover 60 may be formed of a material the same as or similar to that of the bus bar cover 50 described above. For example, the module cover 60 may be formed of various materials as long as the module cover 60 may withstand flames or high temperatures.

The module cover 60 in one embodiment of the present disclosure may be coupled to the battery module 10 together with the bus bar cover 50. For example, the module cover 60 may be coupled to the battery module 10 after the bus bar cover 50 is coupled to the bus bar 20. In this case, the bus bar cover 50 may be inserted into the slot 65 while being coupled to the bus bar 20.

As described above, when both the bus bar cover 50 and the module cover 60 are provided, the terminal 15 of the battery module 10 and the bus bar 20 may be disposed in a space formed by the module cover 60 and the bus bar cover 50, such that, even when a flame is generated outside of the battery module 10, an inflow of flames to the bus bar 20 (or the terminal 15) may be prevented. Also, since the periphery of the terminal 15 is double protected by the bus bar cover 50 and the module cover 60, a high reliability may be provided in terms of flame blocking.

However, the present invention is not limited to the above-described battery pack. For example, the battery pack 1 may be configured to include only the module cover 60 without the bus bar cover 50, or alternatively, the battery pack 1 may be configured to include only the bus bar cover 50 without the module cover 60.

Also, various modifications of the module cover 60 in the example embodiment may be made. In one embodiment, the module cover 60 may be configured to cover only one terminal surface TS, but the present invention is not limited thereto, and the module cover 60 may be configured to enclose the entire battery module 10 other than the bottom surface of the battery module 10. For example, the module cover 60 may be provided to oppose the entire upper and side surfaces of the battery module 10 and may be coupled to each battery module 10. As described above, various modifications of the module cover 60 in these embodiments may be made as long as the module cover 60 may prevent an inflow of flames or conductive particles into the bus bar 20 side.

Figure 8:
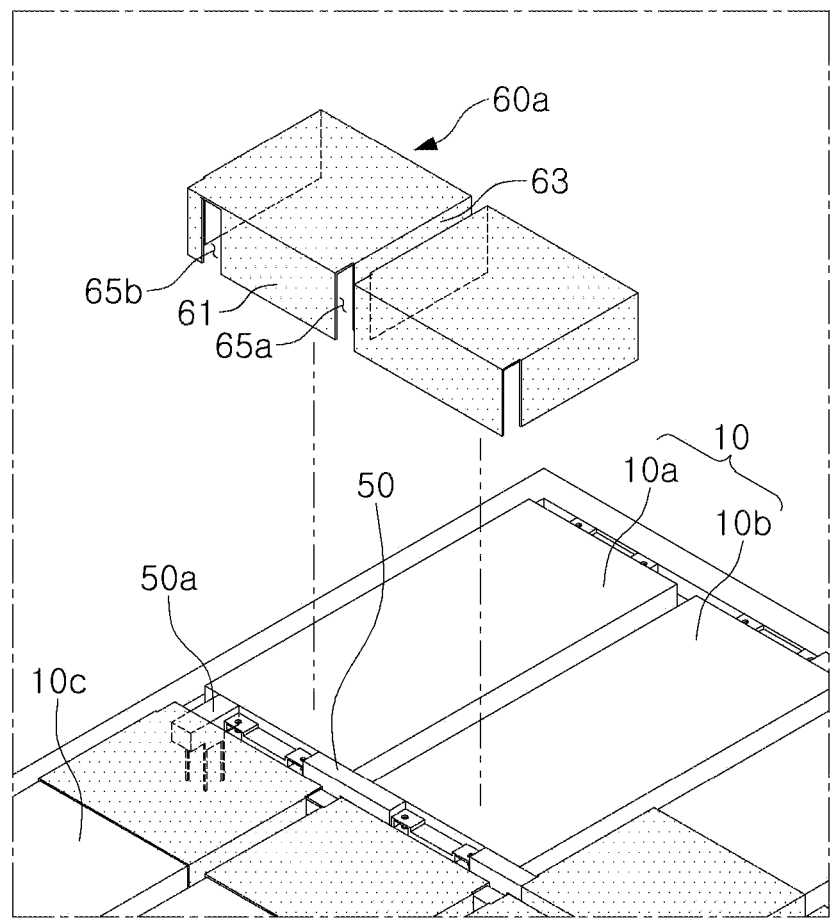
FIG. 8 is an exploded perspective diagram illustrating a portion of a battery pack according to another embodiment of the present disclosure.
Figure 9:
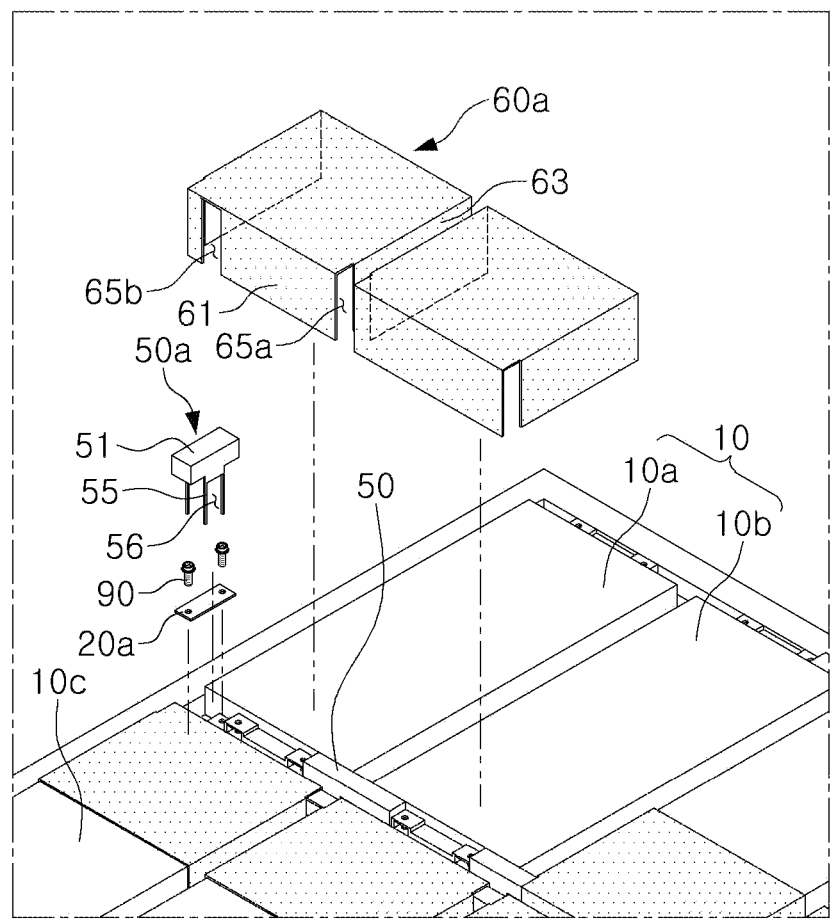
FIG. 9 is an exploded perspective diagram illustrating a bus bar cover illustrated in FIG. 8.

FIG. 8 is an exploded perspective diagram illustrating a portion of a battery pack according to another embodiment. FIG. 9 is an exploded perspective diagram illustrating a bus bar cover illustrated in FIG. 8.

Referring FIGS. 8 and 9, the battery pack in this embodiment may include a bus bar 20a (hereinafter, a second bus bar) for interconnecting two battery modules 10a and 10c arranged such that terminal surfaces of battery modules 10a and 10c oppose each other, in addition to the bus bar 20 (in FIG. 2, hereinafter, a first bus bar).

Accordingly, the bus bar cover 50 may include a bus bar cover 50 (hereinafter, a first bus bar cover) coupled to the first bus bar 20, and a bus bar cover 50a coupled to the second bus bar 20a.

Since the first bus bar 20 and the first bus bar cover 50 are of the same configuration as the bus bar 20 (in FIG. 2) and the bus bar cover 50 (in FIG. 2) of the above-described embodiment(s), the description(s) thereof will not be provided.

The second bus bar 20a may electrically connect two battery modules 10a and 10c disposed above the first reinforcing frame 3a and having terminal surfaces opposing each other.

The second bus bar cover 50a may include an accommodation portion 51 for accommodating the second bus bar 20a therein and coupled to the second bus bar 20a, and an extension portion 55 extending from the accommodation portion 51 in a downward direction.

The extended portion 55 of the second bus bar cover 50a may be disposed in a space between the battery modules 10a and 10c. Since the first reinforcing frame 3a (in FIG. 3) is disposed between the battery modules 10a and 10c arranged such that the terminal surfaces of the adjacent batteries oppose each other, the extension portion 55 of the second bus bar cover 50a may include a frame insertion portion 56 into which the first reinforcing frame 3a is inserted.

The frame insertion portion 56 may be formed as a groove in the form of cutting the extension portion 55. Also, to prevent flames or conductive particles from moving into a gap formed between the frame insertion portion 56 and the first reinforcing frame 3a, the first reinforcing frame 3a may be coupled to the frame insertion portion 56 by being proximate to the frame insertion portion 56.

Accordingly, an overall shape of the frame insertion portion 56 may correspond to a cross-sectional surface of the first reinforcing frame 3a inserted into the frame insertion portion 56. Also, a size or a shape of the frame insertion portion 56 may be varied depending on a size or presence or absence of the first reinforcing frame 3a.

When both the first bus bar 20 and the second bus bar 20a are coupled to a single battery module 10a, the module cover 60 coupled to the corresponding battery module 10a may include (as shown in FIG. 9) a first slot 65a into which the bar 20 is inserted and a second slot 65b into which the second bus bar 20a is inserted. In this case, the first slot 65a may be formed on the side surface cover 63 and the second slot 65b may be formed on the blocking portion 61.

However, the present invention is not limited thereto, and the module cover 60 may include only one of the first slot 65a or the second slot 65b or may include both the first slot 65a and the second slot 65b, depending on the arrangement structure of the bus bar 20.

In the battery pack 1 in the configuration(s) described above, when a flame is generated in the battery module 10, a short circuit may be prevented from occurring in an internal circuit of the battery pack 1 as the bus bar 20 moves.

If a flame is generated in the battery module 10, the case or other structure of the battery module 10 may be melted by heat, and the flame spread to the outside of the case of the battery module 10 may affect the other adjacent battery module. Also, as a structural collapse of the battery module 10 may occur in this process, the bus bar 20 may contact with the case of the battery module 10, the pack case 2, or other structures. In this case, a short circuit may occur in the internal circuit of the battery pack 1, which may cause additional fire or explosion.

However, in the battery pack 1 according to one embodiment of the present disclosure, the bus bar 20 may be accommodated and disposed in an internal space of the bus bar cover 50 or the module cover 60. Therefore, even when the bus bar 20 moves due to the collapse of the battery module 10 described above, the state in which the bus bar 20 is accommodated in the bus bar cover 50 or the module cover 60 may be maintained, such that the bus bar 20 may be prevented from being in contact with the case or surrounding structures. Accordingly, additional issues caused by a short circuit may be prevented.

Also, since the battery pack 1 in one embodiment of the present disclosure may prevent spreading of flames by the module cover 60 or the bus bar cover 50, melting of the insulating layer of the bus bar 20 and insulation of the bus bar 20 caused by flames directly in contact with the bus bar may be prevented, and accordingly, the insulation performance of the bus bar 20 may be continuously maintained even in the thermal runaway situation.

Figure 10:
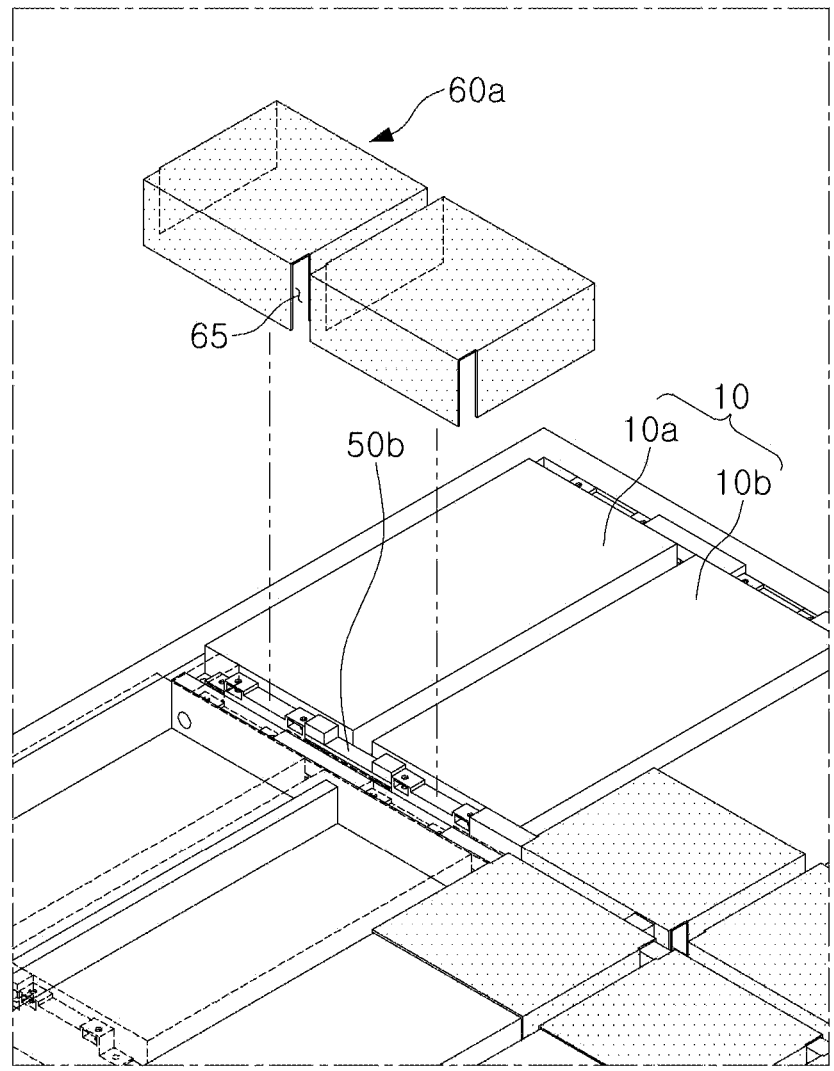
FIG. 10 is an exploded perspective diagram illustrating a portion of a battery pack according to still another embodiment of the present disclosure.
Figure 11:
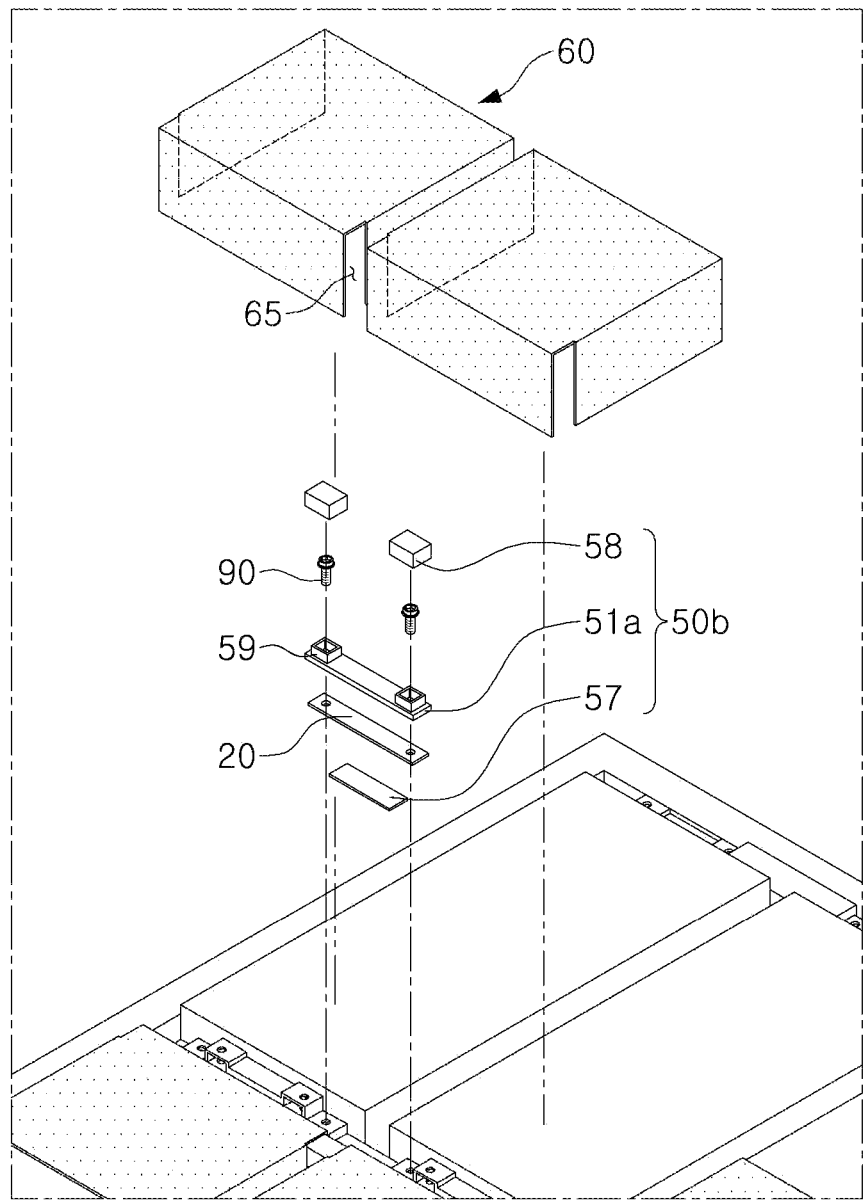
FIG. 11 is an exploded perspective diagram of FIG. 10.

FIG. 10 is an exploded perspective diagram illustrating a portion of a battery pack according to another example embodiment of the present disclosure. FIG. 11 is an exploded perspective diagram of FIG. 10.

Referring to FIGS. 10 and 11, the bus bar cover 50b in this embodiment may be integrally coupled to the bus bar 20.

The bus bar cover 50b in this embodiment may include an accommodation portion 51a coupled to the upper surface of the bus bar 20 and a coupling portion 57 coupled to the lower surface of the bus bar 20.

The accommodation portion 51a may be coupled to the bus bar 20 by having a configuration covering an entire upper surface of the bus bar 20 and an entire side surface of the bus bar 20. Also, the coupling portion 57 may be coupled to the bus bar 20 in a form of covering a portion of the bottom surface of the bus bar 20 other than a portion in which the bus bar 20 is in contact with the terminal 15.

Thus, when the accommodation portion 51a and the coupling portion 57 are coupled to the bus bar 20, only a portion of the bus bar 20 in contact with the terminal 15 may be exposed externally of the bus bar cover 50b.

Also, the bus bar cover 50b in this embodiment may further include a cover portion 58 to prevent the bus bar fastening member 90 from being exposed. The cover portion 58 may be coupled to the accommodation portion 51a, and may have a space in which the bus bar fastening member 90 is accommodated.

The accommodation portion 51a may be provided with a coupling protrusion 59 protruding externally. The coupling protrusion 59 may be disposed along the periphery of the bus bar fastening member 90 disposed on the bus bar 20, and the cover portion 58 may be inserted into the coupling protrusion 59 and may be coupled to the accommodation portion 51a.

The bus bar cover 50b in this embodiment may be formed of a high temperature material such as a stainless steel, refractory or ceramic material. In this case, the bus bar cover 50b may be coupled to the bus bar 20 using an adhesive member. Also, an adhesive member may be interposed between the cover portion 58 and the accommodation portion 51a, but an example embodiment thereof is not limited thereto.

Also, the bus bar cover 50b in this embodiment may be provided with a coating. For example, the accommodation portion 51a may be formed by applying a heat-resistant/insulating material, for example, Epoxy resin, to the upper surface of the bus bar 20, and by applying a heat-resistant/insulating material to the lower surface of the bus bar 20. In this case, the coupling protrusion 59 may not be provided.

According to the aforementioned embodiment(s), when a flame is generated in the battery module, spread of the flame to the other battery module or addition issues caused by a short circuit may be reduced.

While the example embodiments have been illustrated and described above, it will be apparent to those skilled in the art that modifications and variations could be made without departing from the scope of the present disclosure as defined by the appended claims.

What is claimed is:

1. A battery pack, comprising:
a pack case accommodating a plurality of battery modules;
a bus bar coupled to two battery modules among the plurality of battery modules and interconnecting terminals of the two battery modules; and
a bus bar cover accommodating the bus bar therein and coupled to the bus bar,
wherein the bus bar cover is formed as a unitary piece and configured to surround the bus bar and entirely cover an upper surface and side surfaces of the bus bar,
wherein the pack case includes a first reinforcing frame disposed to oppose a terminal surface, which is at least one of side surfaces of the battery module on which a terminal is disposed,
wherein the first reinforcing frame is disposed between the plurality of battery modules,
wherein the bus bar cover includes an accommodation portion including an accommodation space for accommodating the bus bar and an extension portion extending away from the accommodation portion to cover the side surfaces of the bus bar,
wherein the accommodation space includes an opening at a lower side thereof, and the bus bar cover is disposed over the bus bar such that the bus bar is accommodated inside the accommodation space through the opening,
wherein the extension portion includes a first extension portion disposed to oppose the terminal surface, and
wherein the first extension portion is disposed between the first reinforcing frame and the terminal surface.

2. The battery pack of claim 1, wherein the accommodation portion includes:
an upper surface portion opposing the upper surface of the bus bar; and
a side surface portion extending from the upper surface portion and opposing the side surfaces of the bus bar.

3. The battery pack of claim 2, wherein at least a portion of the side surface portion is disposed between the bus bar and a case of the battery module.

4. The battery pack of claim 1, wherein the extension portion includes:
a second extension portion disposed between the two battery modules.

5. The battery pack of claim 1,
wherein the pack case includes a second reinforcing frame disposed between the two battery modules, and
wherein the first extension portion includes a frame insertion portion into which the second reinforcing frame is inserted.

6. The battery pack of claim 1, further comprising a second bus bar cover,
wherein the second bus bar cover includes:
an accommodation portion including an accommodation space for accommodating the bus bar and covering entirely the upper surface and the side surfaces of the bus bar; and
a coupling portion disposed below the bus bar and coupled to the accommodation portion.

7. The battery pack of claim 1, further comprising:
a module cover coupled to each of the battery modules,
wherein the module cover accommodates the terminal surface.

8. The battery pack of claim 7, wherein the module cover has at least one slot into which the bus bar is inserted.

9. The battery pack of claim 7, wherein the module cover comprises mica.

10. The battery pack of claim 7, wherein the module cover is configured to cover an entirety of upper and side surfaces of the battery module formed in a rectangular parallelepiped shape.

11. A battery pack, comprising:
at least two battery modules;
a pack case accommodating the at least two battery modules;

a bus bar electrically connecting the at least two battery modules to each other;

module covers coupled to the at least two battery modules, respectively, wherein each of the module covers accommodates a terminal surface, which is at least one side surfaces of the battery module on which a terminal is disposed therein, and is coupled to the battery module, wherein the pack case includes a first reinforcing frame disposed to oppose a terminal surface, wherein a portion of the module cover is disposed between the first reinforcing frame and the terminal surface, further comprising a bus bar cover accommodating the bus bar therein and coupled to the bus bar, wherein the bus bar cover includes an accommodation portion including an accommodation space for accommodating the bus bar and an extension portion extending away from the accommodation portion to cover the side surfaces of the bus bar, wherein the accommodation space includes an opening at a lower side thereof, and the bus bar cover is disposed over the bus bar such that the bus bar is accommodated inside the accommodation space through the opening, and wherein the pack case includes a second reinforcing frame disposed between the two battery modules, and wherein the extension portion includes a frame insertion portion into which the second reinforcing frame is inserted.

12. The battery pack of claim 11, wherein each of the module covers includes at least one slot into which the bus bar is inserted.

13. A battery pack, comprising:
a pack case accommodating a plurality of battery modules;
a bus bar coupled to two battery modules among the plurality of battery modules and interconnecting terminals of the two battery modules; and
a bus bar cover accommodating the bus bar therein and coupled to the bus bar, wherein the bus bar cover is configured to prevent flames or conductive particles in one battery module from spreading to an adjacent battery module, wherein the bus bar cover includes an accommodation portion including an accommodation space for accommodating the bus bar and an extension portion extending away from the accommodation portion to cover the side surfaces of the bus bar, wherein the pack case includes a first reinforcing frame disposed to oppose a terminal surface, which is at least one of side surfaces of the battery module on which a terminal is disposed and a second reinforcing frame disposed between the two battery modules of the plurality of battery modules, wherein the extension portion of the bus bar cover is disposed between the first reinforcing frame and the terminal surface, wherein the extension portion includes a frame insertion portion into which the second reinforcing frame is inserted.

14. The battery pack of claim 13, wherein the bus bar cover conforms to a shape of the bus bar.

15. The battery pack of claim 13, wherein the bus bar cover comprises at least one of a refractory material, or a ceramic material.

16. The battery pack of claim 15, wherein the bus bar cover comprises mica.

17. The battery pack of claim 13, wherein the bus bar cover comprises means for preventing shorting between the plurality of battery modules.

18. The battery pack of claim 13, further comprising:
a module cover coupled to at least one of the battery modules,
wherein the module cover has a blocking portion disposed adjacent to the first reinforcing frame to prevent the spreading of the flames or conducting particles to an adjacent battery module.

* * * * *